United States Patent Office 3,328,391
Patented June 27, 1967

3,328,391
2,2-DIHALO ETHYLENIMINES AND PREPARATION OF SAME USING DIHALO CARBENES
Joseph M. Sandri, Chicago Heights, and Ellis K. Fields, Chicago, Ill., assignors to Standard Oil Company, Chicago, Ill., a corporation of Indiana
No Drawing. Continuation of application Ser. No. 159,767, Dec. 15, 1961. This application Apr. 25, 1966, Ser. No. 545,164
8 Claims. (Cl. 260—239)

This is a continuation of our copending application Ser. No. 159,767, filed Dec. 15, 1961, and now abandoned, which was a continuation-in-part of our application Ser. No. 835,398, filed Aug. 24, 1959, and now abandoned.

This invention relates to a new and useful method for preparing chemical compounds. This invention also relates to new and useful chemical compounds prepared by the method of this invention.

The new and useful chemical compounds of this invention which can be prepared by the process of this invention contain the structure:

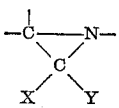

wherein X and Y are each the same or different halides, e.g. F, Cl, Br and I. The preferred halides are Cl and Br.

The chemical compounds containing the above structure will herein be referred to as 2,2-dihalo ethylenimines which is intended to include 2,2-dihalo substituted ethylenimines.

The 2,2-dihalo ethylenimines and 2,2-dihalo substituted ethylenimines are useful as intermediates in the preparation of pharmaceuticals. They are further useful as intermediates in preparing 1-chloro acetanilides from imines by addition of a carbon atom between the carbon atom and nitrogen atom at the imine linkage as will hereinafter be evident. The 1-chloro acetanilides are useful as pesticides and pharmaceutical and dye intermediates. The oil soluble 2,2-dihalo ethylenimines are particularly useful as extreme pressure addition agents of from about 0.05 to about 5 weight percent in lubricating oils.

The 2,2-dihalo ethylenimines are prepared in accordance with the method of this invention by reacting a dihalo carbene with an imine corresponding in structure to the desired 2,2-dihalo ethylenimine. Of course, mixtures of two or more different dihalo carbenes, e.g. a mixture of dibromocarbene and dichlorocarbene or a mixture of chlorobromocarbene and dichlorocarbene, as well as mixtures of two or more imines are also intended. The reaction may advantageously be carried out in the liquid phase at any temperature at which the carbene and imine exist as such, e.g. at a temperature within the range of from about —20° C. to about 140° C. or higher or lower; the temperature of the carbene-imine reaction is not critical. The reaction usually is complete within from about 1 to about 48 hours reaction time. It is preferred that temperature in the range of from about 25° C. to about 50° C. be used and that the reaction be allowed to proceed to completion in from about 4 to about 8 hours reaction time. The dihalo carbene and imine react in equimolar amounts, i.e. one mole of dihalo carbene per mole of —C=N— group present in straight chain linkage (non-cyclic). However, it is more advantageous to use a molar excess of the dihalo carbene based on imine in the reaction because of the instability of the dihalo carbene and because the dihalo carbene must itself be formed in situ during the reaction since it is a species which does not exist long in the free state and cannot be isolated as a free chemical compound.

The dihalo carbene is formed in situ in any manner. For example, at a temperature in the range of about —20° C. to about 140° C., the dihalo carbene can be formed by the action of a strong base on a haloform. Proof of the dihalo carbene is given by W. von E. Doering and W. A. Henderson, Jr., Journal American Chemical Society, 80, 5274 (1958). Strong bases have high affinities for hydrogen halide and set upon the haloform to remove a mole of hydrogen halide, leaving the dihalo carbene in situ in the reaction system. The haloform and strong base are used in about stoichiometric amounts to create the dihalo carbene. Thus, in the total reaction in a system of this invention, about equimolar amounts of haloform, strong base and imine are mixed together, preferably adding the haloform dropwise or intermittently in aliquots over a period of from about 10 minutes to about 4 hours, and the total reaction takes place under the conditions described above to produce the 2,2-dihalo ethylenimines. Advantageously a molar excess of at least 10% and preferably a molar excess of at least 200% of both haloform and strong base can be used based on imine to assure adequate formation of dihalo carbene. The particular amounts of the ingredients added to the system preferably fall within the molar ratios of from 1.1 to 6 moles of haloform and 1.1 to 10 moles of strong base per mole of imine, i.e. per —C=N— group in straight chain linkage. The ratio of strong base to haloform is immaterial since any ratio falling within the above ratios based on imine is sufficient; however the ratio of both strong base and haloform to imine can be increased to increase the speed of reaction.

Alternatively, the dihalo carbene can be prepared in situ by the reaction of an alkyl ester, e.g. methyl, ethyl, propyl, butyl, etc. ester, of trihalo acetic acid such as ethyl trichloroacetate with a strong base such as sodium methoxide in the presence of the amine. Temperature for this reaction is immaterial within the range where the reactants exist and are preferably in the liquid state. A solvent such as a hydrocarbon, e.g. hexane, heptane, benzene, toluene, etc. can be used if desired. The trihaloacetic acids include trichloroacetic acid, tribromoacetic acid, bromodichloroacetic acid, iododichloroacetic acid, etc.

As still another method for formation of the dihalo carbene in situ in the presence of the imine is by thermal decomposition of an alkali or alkaline earth metal salt of trihaloacetic acid in the presence of a solvent at 60 to 150° C. and more usually 80 to 100° C. Carbon dioxide and metal halide are also formed from the decomposition. Useable solvents are the diethers of glycols or polyglycols, e.g. 1,2-dimethoxy ethane or diglyme. Examples of the salts of trihaloacetic acids are sodium trichloroacetate, potassium tribromoacetate, sodium bromodichloroacetate, calcium trichloroacetate, barium trichloroacetate, lithium tribromoacetate, etc.

Because the dihalo carbene is known to react with non-aromatic olefinic bonds (see W. von E. Doering et al., supra) and because the strong base is known to react with such groups, as, for example, carboxylic acids, sulfonic acids, esters, ketones and the like, an additional excess of the strong base (where used) and/or haloform and/or ester or salt of trihaloacetic acid should be used as necessary to complete all such reactions with reactive substituents of the imine, which reactions may proceed to the detriment of the desired reaction. Such technique is know to those skilled in the art.

The dihalo carbene may be any dihalo carbene, such as dichloro carbene, dibromocarbene, chlorobromocarbene, difluorocarbene, diiodocarbene, etc. Thus, where "dihalo" is used herein, it is intended that mixed halo such as "chloro iodo" is included. Accordingly, in the preferred method of forming the 2,2-dihalo ethylenimines, the haloform may be any haloform such as chloroform, bromoform, iodoform, dichlorofluoromethane, bromodichloromethane, etc.

The strong base where used in preparation of dihalo carbenes may be any strong base-reacting compound having a metallic or ammonium cation. All such strong bases have a sufficiently high affinity for hydrogen halide to remove them from the haloform. Such strong bases are well known to those skilled in the art. The preferred strong bases are those compounds defined by the following structural formula:

$$M_a Z_b R_c$$

wherein M is selected from metal and substituted ammonium cations; Z is selected from oxygen and nitrogen; R is selected from hydrogen, an alkyl group containing from 1 to about 19 carbon atoms and an aralkyl group containing from about 7 to about 19 carbon atoms; $a$ is an integer from 1 to 2 inclusive; and $b$ and $c$ are each integers from 0 to 2 inclusive.

Typical examples of the strong bases or strong base reacting compounds are the substituted ammonium, alkali and alkaline earth hydroxides or oxides, such as for example, sodium hydroxide, potassium hydroxide, barium oxide, calcium hydroxide, and the like; the alkali and alkaline earth metal alkoxides such as, for example, sodium methoxide, potassium t-butoxide, calcium ethoxide, ammonium ethoxide, magnesium methoxide, sodium propoxide, lithium ethoxide, and the like; and other bases such as quaternary ammonium compounds, for example, tetraethyl ammonium methoxide, and the like, sodium hydride, lithium hydride, calcium hydride and the like; sodium amide, calcium amide and the like; sodium triphenyl methide, potassium triphenylmethide, and the like; lithium butyl, sodium amyl, potassium phenyl, and the like.

Any imine, i.e. having the >C=N— structure, can be subjected to the reaction of this invention to form a new and useful compound in accordance herewith. The nature of the substituents of the imine is immaterial to the reaction since, as indicated above, sufficient amounts of strong base and/or haloform can be used to complete any reactions with reactive substituents. Although the 2,2-dihalo ethylenimines can be prepared from the corresponding imines, because of the possibility of side reaction of strong base and/or haloform with reactive substituents, the 2,2-dihalo ethylenimine product may not always correspond to the structure of the imine reactant, e.g. due to salt formation by strong base with such substituent groups as —SO₃H, —PO₃H₂, COOH, or reaction of haloform with substituents or reaction of open chain carbon-to-carbon unsaturation with dihalo carbenes, or destruction of such groups as —NO₂ with strong base; all such side reactions are reactions known to the art.

A preferred class of imines which may be reacted in accordance herewith are those imines which correspond to the formula:

$$R_1-\underset{\underset{R_2}{|}}{C}=N-R_3$$

wherein $R_1$ and $R_2$ are each selected from the class consisting of hydrogen, hydrocarbon groups and substituted hydrocarbon groups and $R_3$ is either a hydrocarbon group or substituted hydrocarbon group. The substituted hydrocarbon group can have as the substituents groups selected from the class consisting of —F, —Cl, —Br, —SR', —SO₃R', —P(R')₂, —PO₃(R')₂, —OR',

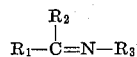

—NO₂, and —N(R')₂ wherein the R' represents hydrogen or the same or different hydrocarbon groups. The hydrocarbon groups of $R_1$, $R_2$, $R_3$ and R' can be any hydrocarbon groups including saturated and unsaturated aliphatic or aromatic hydrocarbon groups, i.e. alkyl, cycloalkyl, alkenyl and aryl and mixtures thereof such as, for example, alkaryl, alkdienyl, cycloalkyl-aryl, etc. The hydrocarbon groups can have any number of carbon atoms since the hydrocarbon group does not enter into the desired reaction except that substituents thereon or open chain unsaturation therein may react with strong base, haloform and/or dihalo carbene as indicated hereinbefore. The hydrocarbon group may range in molecular weight, for example, from methyl up through polycondensed rings and polymeric hydrocarbon groups having molecular weights of 100,000 or more, including solid polymers which may be dissolved in a suitable non-reactive solvent such as benzene, toluene, xylene, carbon tetrachloride, or the like. The preferred imines are those of the above formula wherein hydrocarbon groups have 1 to 30 carbon atoms, (including hydrocarbon groups derived as polymers of such groups) and those imines wherein the substituents are selected from —Cl, —Br, —PO₃(R')₂, —OR', —COOR', —NO₂, and N(R')₂.

Typical imines which would be useable in accordance herewith are acetone ethylimine, 2-chlorobutanone methylimine, formaldehyde t-butyl imine, hydroxyacetone hexylimine, methyl t-butyl ketone dodecylimine, 2-hexanone 2,4 - dimethylheptadecylimine, isophorone methylimine, benzophenone ethylimine, acetophenone methylimine, benzalacetophenone phenylimine, benzil ethylimine, acetone phenylimine, 2-butanone naphthylimine, acetophenone beta-hydroxyethylimine, benzal 2-pyridylimine, benzal benzylimine, benzalacetone n-propylimine, benzylideneaniline, benzal 2-pyrazineimine, ethylidene benzylimine, benzamidine, benzal naphthenylimine, α-benzaliminonaphthalene 4-sulfonic acid, 3-iminobutane-nitrile, hexydecylimine chloride, benzylidene chloroaniline, benzylidene phenetidine, 2-methylimino butyl mercaptan, 3-bromobutanone propylimine, α-benzaliminonaphthalene 4-phosphonic acid, ethylidene methoxypropylimine, ethylidene 2-(distearylamino) ethylimine, benzal α-naphthylimine, butylidene α-aminomethyl phosphonic dimethyl ester, benzal heptadecylaminopropylimine, 2-amylimino butane, N-3,3,5-trimethylcyclohexyl chloral imine, benzal dibutylphenylimine, ethylidene hexylimine, benzal n-octylimine, butylidene iso-octylimine, methylidene n-decylimine, benzal cetylimine, ethylidene beta-stearyl beta-methyl imine, octylidene trimethyloctadecylimine, methylidene hexenylimine, ethylidene N-propargylimine, hydroxyethylidene oleylimine, ethylidene cyclohexylimine, cyclohexylidene allylcyclohexylimine, benzal diallylcyclohexylimine, tolylidene nonylcyclohexylimine, benzal cyclohexenylimine, ethylidene methylcycloheptadienylimine, ethylidene naphthylimine, methylidene anthrylimine, N-dodecyl phenylimine, ethylidene xylylimine, aminoethylidene alphamethyl alpha-pyridyl imine, ethylidene pyrrolylimine, furylidene ethylimine, pyrrolylidene butylimine, N-octadecyl alpha-chloral imine, N-naphthenyl alpha-chloral imine, etc. Other imines such as those imines substituted with the groups mentioned above and with groups other than those mentioned above, e.g. the following groups: azo, diazo, thiazo, osazo, cyano, thiocyano, etc., would also be useable in accordance herewith.

The 2,2-dihalo ethylenimines formed from the above class of imines correspond to the structure:

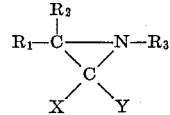

wherein X and Y are as defined above and $R_1$, $R_2$ and $R_3$ are as defined above with the exception of variances in structure due to side reactions with substituents or open chain unsaturation.

Other imines having the

structure useable in accordance herewith will be evident to those skilled in the art.

Where use of the 2,2-dihalo ethylenimine as an extreme pressure agent is intended, it is advantageous that the R groups (i.e. $R_1$, $R_2$, $R_3$ and $R'$) contain a sufficient number of carbon atoms to provide oil solubility. For such use it is preferred that there be at least a total of 7 carbon atoms in the R groups of the 2,2-dihalo ethylenimine for adequate oil solubility and that each aryl R group contains from 6 to about 18 carbon atoms and each alkyl (including alkenyl) R group contains from 1 to 20 carbon atoms.

As an illustration of this invention, the following examples are given:

EXAMPLE I

A three liter 3-necked round bottom flask, equipped with a heating mantle, stirrer, condenser and dropping funnel, was charged with 181.2 g. (1 mole) of N-benzylideneaniline dissolved in 1 liter of dry pentane and 378 g. (7 moles) of sodium methoxide. The dropping funnel was charged with 480 g. (4 moles) of chloroform. About 30 ml. of the chloroform was added to the reaction mixture and the mixture was heated to reflux to initiate the reaction. The heating mantle was removed and the remainder of the chloroform was added in portions of 10 to 20 ml. so as to maintain reflux. After all of the chloroform had been added, the mixture was stirred for 16 hours and then filtered. The filtrate was concentrated in vacuo and the concentrate was cooled in Dry Ice, whereupon crystallization occurred. The crystals were removed by filtration and washed with about 200 ml. of cold pentane. 144 g. (55% yield) of 1,3-diphenyl-2,2-dichloroethylenimine were obtained as a product. The product was recrystallized from hexane and had a melting point of 98–99° C.

The product of Example I was subjected to an elemental analysis and molecular weight determination. The results are listed below in comparison with the theoretical analyses for 1,3-diphenyl-2,2-dichloroethylenimine.

| Analysis | Example | Theoretical |
| --- | --- | --- |
| Wt. Percent C | 64.0 | 63.6 |
| Wt. Percent H | 4.4 | 4.2 |
| Wt. Percent N | 5.1 | 5.3 |
| Wt. Percent Cl | 26.7 | 26.9 |
| Molecular Weight | 268 | 264 |

The structure of 1,3-diphenyl-2,2-dichloroethylenimine was further substantiated by infra-red analysis and nuclear magnetic resonance analysis. The infra-red spectrum contains a peak corresponding to the $CCl_2$ grouping and the nuclear magnetic resonance spectrum is consistent with the proposed structure for the compound.

To further substantiate the structure of the 2,2-dihalo ethylenimines prepared in the example, the prepared compound was hydrolyzed to form a known compound, properties of which were compared with the known properties of the known compound. Accordingly, 5 g. (0.0189 mole) 1,3-diphenyl 2,2-dichloro ethylenimine and 200 ml. of water were refluxed for 15 minutes. The mixture was cooled in an ice bath, filtered and air dried. 4.3 g. (92% yield) of alpha-chloro-alpha-phenylacetanilide, which was recrystallized from naphtha, was obtained. The melting point was 146–148° C.; the infra-red spectrum of the product was identical with the spectrum of authentic alpha-chloro-alpha-phenylacetanilide; and mixed melting point determinations showed no melting point depressions.

Elemental analysis appeared as follows:

| Elements | Calculated for $C_{14}H_{12}ONCl$ | Found in Compound of Example |
| --- | --- | --- |
| C | 68.4 | 68.35 |
| H | 4.89 | 4.92 |
| O | 6.52 | 6.45 |
| N | 5.7 | 5.23 |
| Cl | 14.5 | 14.1 |

EXAMPLE II

This example illustrates the preparation of 1-p-chlorophenyl-3-phenyl-2,2-dichloroethylenimine. To a stirred slurry of 21.6 g. (0.1 mole) of benzylidene p-chloroaniline,[1] M.P. 60–61° (reported: M.P. 62°), 44.9 g. (0.4 mole) of potassium t-butoxide and 250 ml. of hexane was slowly added 47.8 g. (0.4 mole) of chloroform. The reaction mixture was stirred at room temperature for 16 hours. The mixture was filtered with the aid of suction, the residue was washed three times with hexane and the solvent was removed in vacuo from the combined filtrates leaving a solid, crystalline product. After one recrystallization from pentane 20.4 g. (68%) of 1-p-chlorophenyl-3-phenyl-2,2-dichloroethylenimine was obtained. Upon further recrystallization from pentane the product was obtained as light-tan crystals, M.P. 71–72°. The band at 6.2 microns which was present in the infra-red spectrum of the starting material was absent in the product. Analysis was as follows:

Calculated for $C_{14}H_{10}Cl_3N$: C, 56.31; H, 3.38; Cl, 35.62; N, 4.69. Found: C, 55.68; H, 3.69; Cl, 35.2; N, 4.44.

To further substantiate the structure of the product of Example II, and to illustrate its use as an intermediate for preparation of alpha-chloro-alpha-phenyl-p-chloroacetanilide, a portion of the 1-p-chlorophenyl-3-phenyl-2,2-dichloroethylenimine was allowed to stand in an excess of water at room temperature for 24 hours. The starting material was hydrolyzed to produce alpha-chloro-alpha-phenyl-p-chloroacetanilide in a quantitive yield. The product crystallized from 95% ethanol as colorless needles, M.P. 160–161° C. Analysis was as follows:

Calculated for $C_{14}H_{11}Cl_2NO$: C, 60.02; H. 3.96; Cl, 25.31; N, 5.00. Found: C, 59.80; H, 4.22; Cl, 24.8; N, 4.66.

EXAMPLE III

This example illustrates the preparation of 1-p-ethoxyphenyl-3-phenyl-2,2-dichloroethylenimine. A total of 47.8 g. (0.4 mole) of chloroform was slowly added to a stirred mixture of 22.5 g. (0.1 mole) of benzylidene p-phentidine[2] (light-yellow plates from 95% ethanol, M.P. 72–74°, reported M.P. 76°), 44.9 g. (0.4 mole) of potassium t-butoxide and 350 ml. of hexane. The reaction mixture was stirred at room temperature for 18 hours. The mixture was heated to reflux and filtered with the aid of suction, the residue was washed with hot hexane and the solvent was removed from the combined filtrates in vacuo leaving 28.2 g. (91%) of a crude, crystalline residue. The product, 1-p-ethoxyphenyl-3-phenyl-2,2-dichloroethylenimine, crystallized from hexane in the form of colorless plates, M.P. 76.5–77.5° C. The band at 6.2 microns which was present in the infra-red spectrum of the starting material was absent in the product. Analysis was as follows:

Calculated for $C_{16}H_{15}Cl_2NO$: C, 62.35; H, 4.91; Cl, 23.01; N, 4.55. Found: C, 63.50; H, 5.37; Cl, 19.0; N, 4.34.

(The analysis was run the same day that the sample was sumbitted. However, a strong evolution of hydrogen chloride gas was noted upon return of the sample that same day.)

To further substantiate the identity of the product of Example III and as an illustration of its use as an intermediate, alpha-chloro-alpha-phenyl-p-ethoxyacetanilide was formed from the product as follows: A mixture of 1-p-ethoxyphenyl-3-phenyl-2,2-dichloroethylenimine and an excess of water was boiled for five minutes. After a strong evolution of hydrogen chloride gas a solid product, alpha-chloro-alpha-phenyl-p-ethoxyacetanilide, was produced in a quantitative yield. The product crystallized from methanol as colorless plates, M.P. 145–146.5° C. Analysis was as follows:

[1] Synthesized by a procedure patterned after that found in Organic Synthesis, vol. I, p. 80.
[2] Ibid.

Calculated: C, 66.32%; H, 5.57%; N, 4.83%. Found: C, 66.43%; H, 5.91%; N, 4.76%.

The 2,2-dihalo ethylenimines of this invention are particularly useful as extreme pressure addition agents for addition to lubricating oils. As an example of the extreme pressure imparting properties of such compounds, 2% of the compound of Example I was added to a solvent-extracted 30 base mineral oil and was subjected to extreme pressure tests on an Almen machine. The base oil alone was also tested; 2 runs were made for each sample. The results of the Almen machine tests were as follows:

| Sample | Pass, lb. | Fail, lb. |
|---|---|---|
| Base oil alone | 8 | 10 |
|  | 8 | 10 |
| Base oil plus 2% 1,3-diphenyl-2,2-dichloro ethylenimine of Example I | 16 | 18 |
|  | 16 | 18 |

The above data show that the 1,3-diphenyl-2,2-dichloro ethylenimine markedly increases the load carrying ability of the base oil.

The compositions described herein can be used as indicated above in varying amounts of from about 0.05 to about 5 weight percent as extreme pressure agents in lubricating oils. Although the present invention has been illustrated by the use of the additive compositions in mineral lubricating oils, it is not restricted thereto. Other lubricating oil bases can be used, such as hydrocarbon oils, both natural and synthetic, for example, those obtained by the polymerization of olefins, as well as synthetic lubricating oils of the alkylene oxide type and the mono and polycarboxylic acid ester type, such as the oil soluble esters of pelargonic acid, adipic acid, sebacic acid, azelaic acid, etc. It is also contemplated that various other well known additives, such as antioxidants, anti-foaming agents, pour point depressors, extreme pressure agents, anti-wear agents, may be incorporated in lubricating oils containing the additives of our invention.

Concentrates of a suitable oil base containing more than 2%, for example up to 30% or more, of the additives of this invention alone or in combination with other additives can be used for blending with hydrocarbon oils or other oils in the proportions desired for the particular conditions of use to give a finished lubricating product containing the additives of this invention.

Unless otherwise stated, the percentages given herein and in the claims are percentages by weight.

It is evident that we have provided certain new and useful compositions of matter and have also provided a method for making such compositions. The compositions are the 2,2-dihalo ethylenimines containing the structure:

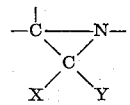

with X and Y particularly defined herein.

What we claim is:
1. The method of preparing chemical compounds which method comprises reacting haloform with a strong base and a compound defined by the structure:

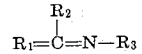

wherein $R_1$, $R_2$ and $R_3$ are each selected from the class consisting of hydrogen, hydrocarbon and substituted hydrocarbon wherein the substituent of said substituted hydrocarbon is a member selected from the class consisting of Cl, Br, $PO_3(R')_2$, $OR'$, $COOR'$, $NO_2$, and $N(R')_2$ wherein $R'$ is selected from the class consisting of hydrogen and hydrocarbon, said reacting being at a temperature within the range of from about −20° C. to about 140° C.

2. The method of claim 1 wherein in the reacting step a molar excess of haloform is used based on moles of imine and a molar excess of strong base having an affinity for hydrogen halide is used based on moles of imine.

3. The method of claim 1 wherein said temperature is in the range of from about 25° C. to about 50° C.

4. The method of preparing chemical compounds which comprises reacting an alkyl ester of trihalo acetic acid selected from the group consisting of methyl, ethyl, propyl and butyl esters with a strong base and a compound defined by the structure:

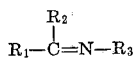

wherein $R_1$, $R_2$ and $R_3$ are each selected from the class consisting of hydrogen, hydrocarbon and substituted hydrocarbon wherein the substituent of said substituted hydrogen is a member selected from the class consisting of Cl, Br, $PO_3(R')_2$, $OR'$, $COOR'$, $NO_2$, and $N(R')_2$ wherein $R'$ is selected from the class consisting of hydrogen and hydrocarbon.

5. The method of preparing chemical compounds which comprises reacting an alkali or alkaline earth metal salt of a trihalo acetic acid by thermal decomposition of said salt at a temperature of 60 to 150° C. with a compound defined by the structure:

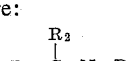

wherein $R_1$, $R_2$ and $R_3$ are each selected from the class consisting of hydrogen, hydrocarbon and substituted hydrocarbon wherein the substituent of said substituted hydrocarbon is a member selected from the class consisting of Cl, Br, $PO_3(R')_2$, $OR'$, $COOR'$, $NO_2$, and $N(R')_2$ wherein $R'$ is selected from the class consisting of hydrogen and hydrocarbon.

6. 1,3-diphenyl-2,2-dichloroethylenimine.
7. 1 - p - chlorophenyl - 3 - phenyl - 2,2 - dichloroethylenimine.
8. 1-p-ethoxyphenyl-3-phenyl-2,2-dichloroethylenimine.

No references cited.

ALEX MAZEL, *Primary Examiner.*

ALTON D. ROLLINS, *Assistant Examiner.*